(12) United States Patent
Iyer et al.

(10) Patent No.: US 10,433,171 B2
(45) Date of Patent: *Oct. 1, 2019

(54) SYSTEM AND METHOD FOR CREATING AND MANAGING WIRELESS NETWORKS

(71) Applicant: ANI TECHNOLOGIES PRIVATE LIMITED, Bengaluru, Karnataka (IN)

(72) Inventors: Sriram V. Iyer, Karnataka (IN); Vasuki K. Setlur, Karnataka (IN); Ankit Bhati, Koramangla (IN); Nagamani Raajan, Tamilnadu (IN)

(73) Assignee: ANI Technologies Private Ltd., Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,532

(22) Filed: May 7, 2019

(65) Prior Publication Data

US 2019/0268768 A1 Aug. 29, 2019

Related U.S. Application Data

(63) Continuation-in-part of application No. 15/627,152, filed on Jun. 19, 2017, now Pat. No. 10,334,438.

(30) Foreign Application Priority Data

Jun. 21, 2016 (IN) .............................. 201641021213

(51) Int. Cl.
*H04W 12/06* (2009.01)
*H04W 16/16* (2009.01)
(Continued)

(52) U.S. Cl.
CPC ........... *H04W 12/06* (2013.01); *H04L 63/083* (2013.01); *H04L 63/0876* (2013.01);
(Continued)

(58) Field of Classification Search
CPC ..... H04W 84/12; H04W 12/06; H04W 76/11; H04W 84/18; H04W 48/08; H04W 8/26;
(Continued)

(56) References Cited

U.S. PATENT DOCUMENTS 8,627,420 B2 1/2014 Furlan et al.
9,078,200 B2 7/2015 Wuergler et al.
(Continued)

FOREIGN PATENT DOCUMENTS

WO 2016127138 A1 8/2016

*Primary Examiner* — Quan M Hua
(74) *Attorney, Agent, or Firm* — Goldberg Segalla LLP

(57) ABSTRACT

System and method for creating multiple wireless networks are provided. A user device transmits a first device identifier to a server. Based on the first device identifier, the server transmits a first wireless network identifier and a first password to a first communication device that creates a first wireless network, which is accessed by the user device. Further, the user device transmits the first device identifier to the server. The second communication device receives the first wireless network identifier and first password from the server, and creates the first wireless network, which is automatically accessed by the user device. Further, another user device transmits a second device identifier to the server. The second communication device receives a second wireless network identifier and a first password from the server. The second communication device creates a second wireless network, which is automatically accessed by another user device.

10 Claims, 6 Drawing Sheets

(51) Int. Cl.
    *H04W 4/02*    (2018.01)
    *H04W 8/24*    (2009.01)
    *H04W 48/20*    (2009.01)
    *H04W 8/00*    (2009.01)
    *H04L 29/06*    (2006.01)
    *H04W 84/12*    (2009.01)

(52) U.S. Cl.
    CPC ............ *H04W 4/023* (2013.01); *H04W 8/005* (2013.01); *H04W 8/24* (2013.01); *H04W 16/16* (2013.01); *H04W 48/20* (2013.01); *H04W 84/12* (2013.01)

(58) Field of Classification Search
    CPC ....... H04W 12/08; H04W 4/80; H04W 76/10; H04W 88/06; H04W 48/16; H04W 48/18; H04W 8/186; H04W 12/00508; H04W 12/00516; H04L 63/08; H04L 63/10; H04N 21/2143; H04N 21/4126; H04N 21/4182
    See application file for complete search history.

(56) References Cited

U.S. PATENT DOCUMENTS

| | | |
|---|---|---|
| 9,264,905 B2 | 2/2016 | Ferguson-Jarnes et al. |
| 2015/0024688 A1 | 1/2015 | Hrabak et al. |

SYSTEM AND METHOD FOR CREATING AND MANAGING WIRELESS NETWORKS

CROSS-RELATED APPLICATIONS

This application is a continuation-in-part of U.S. patent application Ser. No. 15/627,152, filed Jun. 19, 2017, which claims priority of Indian Application Serial No. 201641021213, filed Jun. 21, 2016, the contents of which are incorporated herein by reference.

FIELD

The present disclosure relates generally to wireless networks, and more particularly to creating and managing multiple wireless networks in shared resource environments.

BACKGROUND

In today's connected world, it is extremely important to have continuous access to the Internet. The Internet and assistance that the Internet provides have become an integral necessity of daily lives. Thus, it is essential to be connected to the Internet even while travelling to have an uninterrupted access to the assistance that the Internet provides. Commercial vehicles provide Internet access by way of wireless networks to users in transit. The users book the commercial vehicles for commuting to and from workplaces daily and thus the Internet access is an important value-added service provided by the commercial vehicles. With the advancement in the field of wireless networks, it has become possible for handheld devices and laptop computers, carried by the users, to connect to the Internet while the users are in transit. Examples of handheld devices include mobile and/or cellular phones, tablets, personal digital assistants (PDAs), and the like. Examples of the wireless networks include Wi-Fi networks, Bluetooth networks, ZigBee networks, and the like. Typically, the wireless networks are created by access points. The access points function as gateways to the Internet. Thus, the access points are mediators between the handheld devices and the Internet. The access points are configured to receive access requests from the handheld devices, authenticate the handheld devices, and provide access of the Internet to the handheld devices. Examples of the access points include routers, LAN controllers, Universal Serial Bus (USB) dongles, and the like. Alternatively, mobile phones and tablets may also function as the access points by creating the Wi-Fi hotspots that are accessed by the handheld devices. Examples of the commercial vehicles include a taxi, a cab, a bus, fleet vehicles, and the like.

Typically, the users while travelling on the commercial vehicles (for instance, the taxi or the cab) connect to the Internet via the access points available in the commercial vehicles. Each commercial vehicle includes at least one of a wireless router, the mobile phone, and USB dongles that function as the access point and create the Wi-Fi hotspots. Each Wi-Fi hotspot created in the commercial vehicle has a Service Set Identifier (SSID) and a password. The SSID and password are inputted by the user in the handheld device to connect with the Wi-Fi hotspot and access the Internet. Generally, the chauffeur of the commercial vehicle is aware of the SSID and the password of the Wi-Fi hotspot. The chauffeur communicates the SSID and the password of the Wi-Fi hotspot to the user. The SSID and the password are specific to the Wi-Fi hotspot of the commercial vehicle. Thus, each commercial vehicle with the Wi-Fi hotspot has a different SSID and password. As the user travels in different commercial vehicles, the user has to re-connect to the Wi-Fi hotspot with different SSIDs and enter the corresponding passwords each time. The re-connection to different Wi-Fi hotspot is a tedious and time-consuming process. Additionally, as the password for the Wi-Fi hotspot is known to the chauffeur of the commercial vehicle and the user, there are security risks involved with the use of the Wi-Fi hotspot. For example, the chauffeur may himself misuse the Wi-Fi hotspot or access user data stored in the handheld device of the user. The user data includes personal, professional, and financial information of the user. Furthermore, the use of Wi-Fi hotspots cannot be regulated, as the chauffeur controls the Wi-Fi hotspot and there is no track of historical and current usage of the Wi-Fi hotspots.

To solve the aforementioned drawbacks, the Wi-Fi hotspot in the commercial vehicles is made accessible to each user with different password. When the user enters the commercial vehicle and connects with the Wi-Fi hotspot by way of the handheld device, a one-time password is generated by a backend server and sent to the handheld device. Thus, every time the user re-connects with the Wi-Fi hotspot, a new one-time password is generated by the backend server and transmitted to the handheld device. The access point authenticates the handheld device based on the one-time password and provides the access of the Internet to the handheld device. Thus, the chauffeur and the user are not aware of the password of the Wi-Fi hotspot as the password changes for every session initiated by the user. However, there is a need to re-enter the passwords every time the user connects with the Wi-Fi hotspot. Also, the backend server is required to generate multiple passwords for same user every time the user connects with the Wi-Fi hotspot. Furthermore, the user needs to interact with a web-page that assists the user in generating the one-time password. The web-page may request the user to input his/her name, telephone number, email ID, and the like. The web-page may also display a non-skippable advertisement to the user before generating the one-time password. Thus, the user is required to interact with the web-page every time the user connects with the Wi-Fi hotspot which is extremely tedious and time consuming. Additionally, there are delays involved in receiving the one-time password by the handheld devices thereby hampering connectivity and accessibility to the Internet.

Thus, there is a need for a system that provides a seamless access to the wireless networks and effectively manages the wireless networks in shared resources environments.

SUMMARY

In an embodiment of the present disclosure, a method for creating multiple wireless networks, such as one or more Wi-Fi networks and one or more Bluetooth networks, is provided. A first device identifier of a first user device is transmitted to a server by at least one of a first communication device of a first vehicle and the first user device associated with a first user. The first communication device receives a first wireless network identifier from the server. The first wireless network identifier is associated with the first device identifier of the first user device and is generated by the server based on the first device identifier. The first communication device further receives a first password from the server. The first password is associated with at least one of the first wireless network identifier and the first device identifier of the first user device and is generated by the server based on the first device identifier. The first communication device creates a first wireless network based on at least the first wireless network identifier and the first password, whereby the first user device connects to the first wireless network using the first wireless network identifier and the first password. A second communication device of a second vehicle receives the first wireless network identifier and the first password from the server. The server receives the first device identifier of the first user device from at least one of the second communication device and the first user device, and transmits the first wireless network identifier and the first password to the second communication device based on the first device identifier of the first user device. The second communication device re-creates the first wireless network based on the first wireless network identifier and the first password, after the first wireless network created by the first communication device is disconnected. The first user device may re-connect to the first wireless network created by the second communication device using the first wireless network identifier and the first password. The second communication device further receives a second wireless network identifier and a second password from the server. The server receives a second device identifier of a second user device from at least one of the second communication device and the second user device, and transmits the second wireless network identifier and the second password to the second communication device based on the second device identifier of the second user device. The second communication device further creates a second wireless network based on the second wireless network identifier and the second password. The second user device may connect to the second wireless network created by the second communication device using the second wireless network identifier and the second password. The first and second wireless networks may be the same wireless network or different wireless networks. Further, the second wireless network is created while the first user device is connected with the first wireless network. Thus, the first user device and the second user device may be connected to the first wireless network and the second wireless network, respectively, at the same time in the second vehicle. The first or the second wireless network is a Wi-Fi network. The first and second wireless network identifiers are a service set identifiers (SSIDs) of the Wi-Fi network, and the first or the second user device is at least one of a mobile device, a cellular phone, a tablet, and a laptop. Further, the first or the second communication device is a multi SSID device that is configured for creating one or more wireless networks including at least one of the first and second wireless networks. The multi SSID device may include one or more SSIDs for facilitating one or more wireless network in the same vehicle for one or more users travelling in the same vehicle.

In another embodiment of the present disclosure a method for creating multiple wireless networks, such as one or more Wi-Fi networks and one or more Bluetooth networks, is provided. A server receives a first device identifier from at least one of a first user device and a first communication device of a first vehicle. The first device identifier is associated with the first user device. The server generates a first wireless network identifier and a first password based on the first device identifier associated with the first user device. The server transmits the first wireless network identifier and the first password to the first communication device. The server instructs the first communication device to create the first wireless network based on at least the first wireless network identifier and the first password. The first user device may connect to the first wireless network using the first wireless network identifier and the first password stored in a memory of the first user device. The server further receives the first device identifier from at least one of the first user device and a second communication device of a second vehicle. The server transmits the first wireless network identifier and the first password to the second communication device. The server instructs the second communication device to re-create the first wireless network based on the first wireless network identifier and the first password, after the first wireless network created by the first communication device is disconnected. The first user device may re-connect to the first wireless network created by the second communication device using the first wireless network identifier and the first password stored in the memory of the first user device. The server further receives a second device identifier from at least one of a second user device and the second communication device. The server transmits a second wireless network identifier and a second password to the second communication device. The second wireless network identifier and the second password may have been previously generated by the server based on the second device identifier associated with the second user device, as generated for the first user device. The server further instructs the second communication device to create a second wireless network based on the second wireless network identifier and the second password. The second user device may connect to the second wireless network using the second wireless network identifier and the second password stored in a memory of the second user device. The first and second wireless network identifiers are a service set identifiers (SSIDs) of the Wi-Fi network, and the first or the second user device is at least one of a mobile device, a cellular phone, a tablet, and a laptop. Further, the first or the second communication device is a multi SSID device that is configured for creating one or more wireless networks including at least one of the first and second wireless networks. The multi SSID device may include one or more SSIDs for facilitating one or more wireless network in the same vehicle for one or more users travelling in the same vehicle.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an", and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
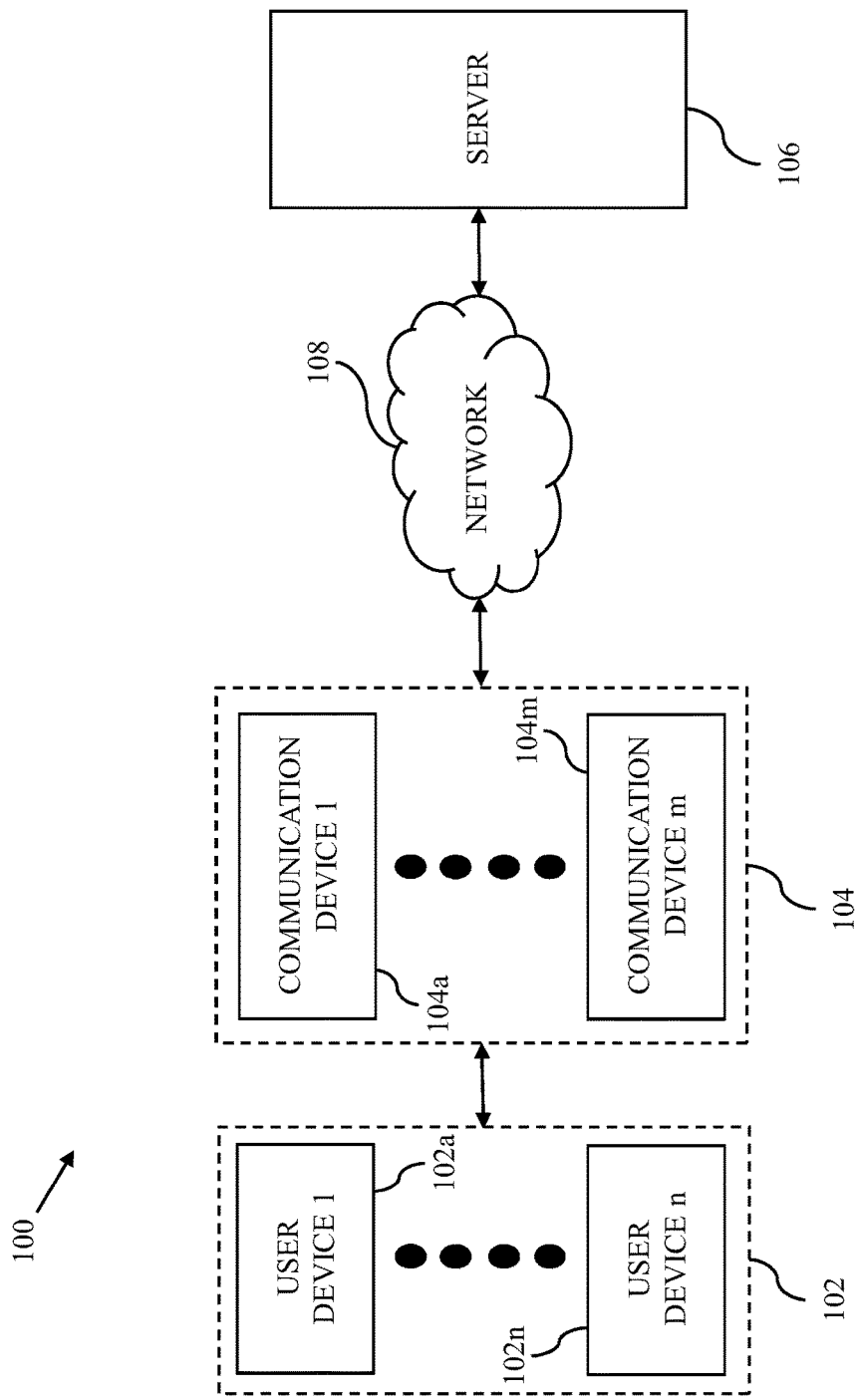
FIG. 1 illustrates a schematic block diagram of a system for creating a wireless network, in accordance with an embodiment of the present disclosure.

Referring now to FIG. 1, a schematic block diagram of a system 100 for creating a wireless network, in accordance with an embodiment of the present disclosure, is shown. Examples of the wireless network include Wi-Fi networks, Bluetooth networks, ZigBee networks, and the like. The system 100 includes multiple user devices 102a-102n (also referred to as 'a set of user devices 102a-102n'), multiple communication devices 104a-104m (also referred to as 'a set of communication devices 104a-104m'), and a server 106. Examples of the user devices 102 include mobile phones, tablets, personal digital assistants (PDAs), laptops, phablets, and the like. The communication devices 104 are connected to the server 106 by way of a network 108. Examples of the communication devices 104 include Wi-Fi routers, hubs, gateways, LAN controllers, Universal Serial Bus (USB) dongles, and the like. Alternatively, the mobile phones and tablets may also function as the communication devices 104 by creating the Wi-Fi network that is accessed by user devices 102. Examples of the network 108 include Local Area Network (LAN), Wide Area Network (WAN), wireless LAN (WLAN), cellular networks, IP networks, and the like.

The system 100 may be deployed in multiple commercial vehicles such as taxis, cabs, buses, trains, flights, freight carriers, and the like to provide network access, such as Internet access, to the users in transit. Additionally, the system 100 may be deployed in private workspaces, commercial office spaces, shared office spaces, club houses, hospitals, private residences, gymnasiums, social gatherings, restaurants, coffee shops, and the like.

The user devices 102a-102n are typically handheld devices that wirelessly connect with the communication devices 104. Each user device 102 is owned by a corresponding user. Each user device 102 includes a wireless communication module (not shown) that enables the user device 102 to connect wirelessly with the communication device 104 and access the Internet. The wireless communication module connects with available wireless networks, created by the communication devices 104, in vicinity of the user device 102. For instance, the user device 102 connects with the Wi-Fi network created by the communication device 104 when the user device 102 is in the vicinity of the communication device 104. The Wi-Fi network is created by the communication device 104 that functions as gateway to the Internet. In the preferred embodiment, the user device 102 is the mobile phone 102 of the user. The mobile phones 102 are configured to connect with the Wi-Fi network and the cellular network. Further, each mobile phone 102 has a device identifier associated with it. Examples of the device identifier include an international mobile equipment identity (IMEI) number, a unique device identifier (UDID), a unique device name, a unique device number, and the like. Additionally, cellular network providers assign a cell phone number to the mobile phone 102. The cell phone number of the mobile phone 102 may also be used as the device identifier of the mobile phone 102. Moreover, as the mobile phone 102 is owned by the user, unique name, email ID, social security number, passport number, and the like, of the user may also be used as the device identifier. Further, each of the user devices 102 also includes a memory (not shown). When the user device 102 connects to the Wi-Fi network, the user device 102 stores a Service Set Identifier (SSID) and a password of the Wi-Fi network in the memory as a saved network. If the SSID and password of the Wi-Fi network are stored in the memory, the user device 102 automatically connects to the Wi-Fi network without user's intervention. In an alternate embodiment, each user device 102 includes a global positioning system (GPS) unit (not shown). The GPS unit tracks location of the user device 102 and generates location data corresponding to the user device 102. The location of the user device 102 may alternatively be tracked by using base stations of the cellular networks.

The communication devices 104 function as gateways between the user devices 102 and the Internet. The communication devices 104 create the wireless networks based on instructions received from the server 106. The communication devices 104 are configured to receive network access requests from the user devices 102, authenticate the user devices 102 based on passwords, and provide access to the Internet to the user devices 102. Examples of the communication devices 104 include routers, LAN controllers, universal serial bus (USB) dongles, and the like. In the preferred embodiment, the set of communication devices 104a-104m are located in various taxis. Each taxi includes one communication device 104 which creates the Wi-Fi network accessible by the users seated in the taxi. Typically, the communication device 104 is a mobile phone placed in the taxi that creates the W-Fi network accessible by the user. It is well known to the person skilled in the art that mobile phones may be used to create the Wi-Fi networks (also referred to as Wi-Fi hotspots). Further, the communication device 104 is configured to create multiple Wi-Fi networks each with different wireless network identifier and password in the taxi. The wireless network identifiers of the Wi-Fi network are the Service Set Identifiers (SSIDs). The communication device 104 creates a unique Wi-Fi network for the user boarding the taxi. As the communication device 104 creates unique Wi-Fi network every time a different user boards the taxi, the communication device 104 is shared by multiple users to access the Internet. Thus, the system 100 is a shared resource environment in which each communication device 104 is shared by multiple user devices 102. In an alternate embodiment, each communication device 104 includes a GPS unit (not shown). The GPS unit of the communication device 104 tracks location of the taxi and generates location data corresponding to the communication device 104.

The communication devices 104a-104m are connected to the server 106 by way of the network 108. The server 106 includes a database that stores a set of wireless network identifiers, a set of passwords, and a set of device identifiers. The set of device identifiers correspond to the set of user devices 102a-102n. Further, the set of wireless network identifiers and set of passwords correspond to the set of device identifiers. In the preferred embodiment, the server 106 generates and stores a wireless network identifier and a password for each device identifier in the set of device identifiers. Since, each device identifier corresponds to one user device 102 and each user device 102 is owned by the corresponding user, the wireless network identifiers and the passwords correspond to the users. Further, the server 106 is configured to send the instructions to the communication devices 104a-104m for creating a Wi-Fi network with a specific wireless network identifier and password. The server 106 also periodically receives location data of the communication devices 104a-104m and the user devices 102a-102n. In an embodiment, the server 106 receives device identifier of the user device 102 by way of the cellular network. When the server 106 receives the device identifier of the user device 102, the server 106 transmits network configuration information to the communication device 104. The network configuration information includes the wireless network identifier and password that enables the communication device 104 to create the Wi-Fi network in the taxi.

In operation, a first communication device 104a is placed in a first taxi. A user device 102a includes a software application that facilitates booking of the first taxi. For instance, the software application is a taxi booking application that enables user to book the first taxi from multiple available taxis. The taxi booking application facilitates creation of a first account of the user of the user device 102a. The first account includes first device identifier of the user device 102a, service preferences of the user of the user device 102a, payment details of the user of the user device 102a, and the like. The taxi booking application stores the account of the user of the user device 102a in the server 106. Additionally, the taxi booking application may access location information of the user device 102a generated by a GPS unit of the user device 102a. The location information of the user device 102a allows the server 106 to identify available taxis near the user device 102a. Further, the user device 102a transmits a first booking request for the first taxi by way of the taxi booking application to the server 106. The taxi booking application uses the cellular network to transmit the first booking request and location data of the user device 102a to the server 106.

The server 106 transmits the location data of the user device 102a and the first booking request to the first communication device 104a. The first communication device 104a displays location of the user device 102a to a chauffeur of the first taxi. The chauffeur of the first taxi approaches the location of the user device 102a. The server 106 periodically receives location of the first communication device 104a, as the first taxi approaches the location of the user device 102a. When the first taxi arrives at the location of the user device 102a, the user of the user device 102a boards the first taxi. The user device 102a transmits a Wi-Fi network access request to the server 106 or a trigger, such as an initiation of the trip by the chauffeur. The Wi-Fi network access request includes the first device identifier of the user device 102a. Further, the server 106 receives the Wi-Fi network access request and detects that the user device 102a has booked the first taxi. The server 106 compares the first device identifier with each device identifier in the set of device identifiers. When the first device identifier does not match with any device identifier in the set of device identifiers, the server 106 stores the first device identifier in the set of device identifiers. Further, the server 106 generates and stores a first wireless network identifier and a first password corresponding to the first device identifier. Further, the server 106 transmits the network configuration information that includes first wireless network identifier and the first password to the first communication device 104a and the user device 102a. Finally, the first communication device 104a creates a Wi-Fi network using the first wireless network identifier as the SSID and the first password as access password. The user device 102a connects with the Wi-Fi network created by the first communication device 104a using the first wireless network identifier and the first password and accesses the Internet. The user device 102a stores the first wireless network identifier and the first password in its memory as a saved network.

Further, the user device 102a may send a second booking request for booking a second taxi by way of the taxi booking application. The second taxi, which includes a second communication device 104b, receives the second booking request and approaches the location of the user device 102a. When the second taxi confirms the second booking request, the server 106 receives the first device identifier from the user device 102a. The server 106 retrieves the first wireless network identifier and the first password associated with the user device 102a. Further, the server 106 transmits the first wireless network identifier and the first password to the second communication device 104b. The second communication device 104b creates the Wi-Fi network with the first wireless network identifier as the SSID and the first password as the access password. As the first wireless network identifier and the first password are stored in the memory of the user device 102a, the user device 102a automatically connects with the Wi-Fi network created by the second communication device 104b.

A person skilled in the art would appreciate that the disclosure facilitates creation of the Wi-Fi network that is specific to a second user device 102b, when a second user with the second user device 102b sends a booking request for booking the same taxi and the taxi is allocated to the second user device 102b. The second user device 102b is owned by the second user. In other words, the disclosure facilitates seamless creation and management of the Wi-Fi networks, which have SSIDs and passwords specific to the user devices and change dynamically based on the user device requesting the taxi.

Figure 2:
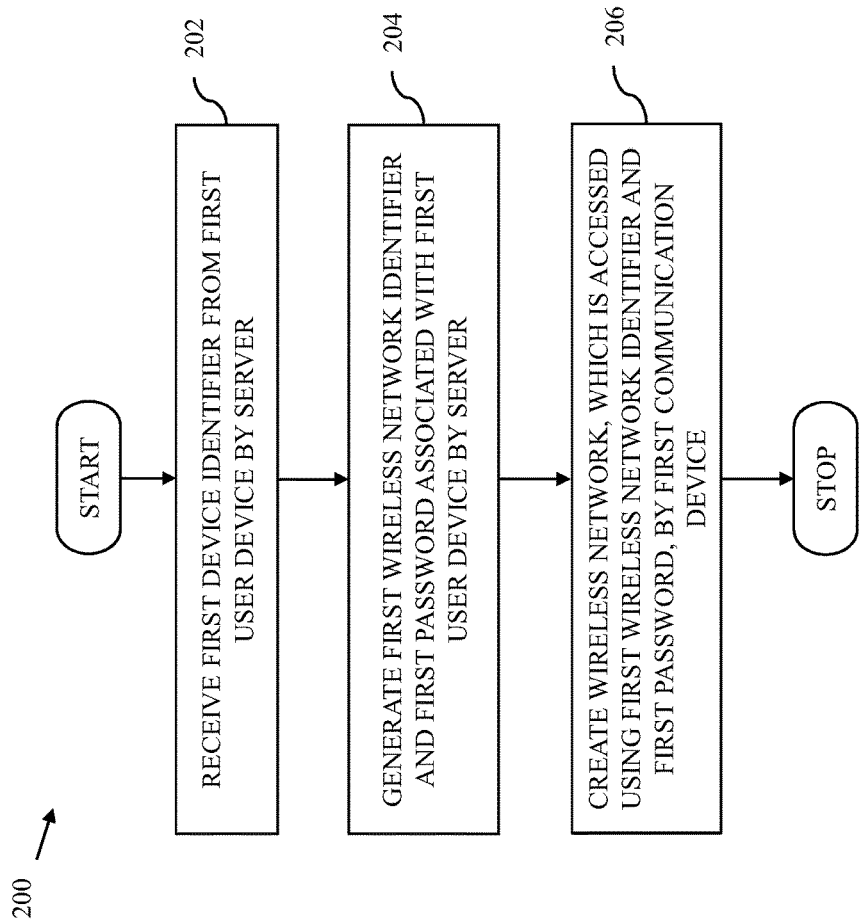
FIG. 2 illustrates a flow chart to illustrate a method for creating the wireless network, in accordance with an embodiment of the present disclosure.

Referring now to FIG. 2, a flow chart illustrating a method 200 for creating a wireless network, in accordance with an embodiment of the present disclosure, is shown. At step 202, the server 106 receives the first device identifier from the user device 102*a*. At step 204, the server 106 generates the first wireless network identifier and the first password associated with the user device 102*a*. At step 206, the first communication device 104*a* creates the wireless network, which is accessed by the first user device 102*a* using the first wireless network identifier and the first password.

Figure 3:
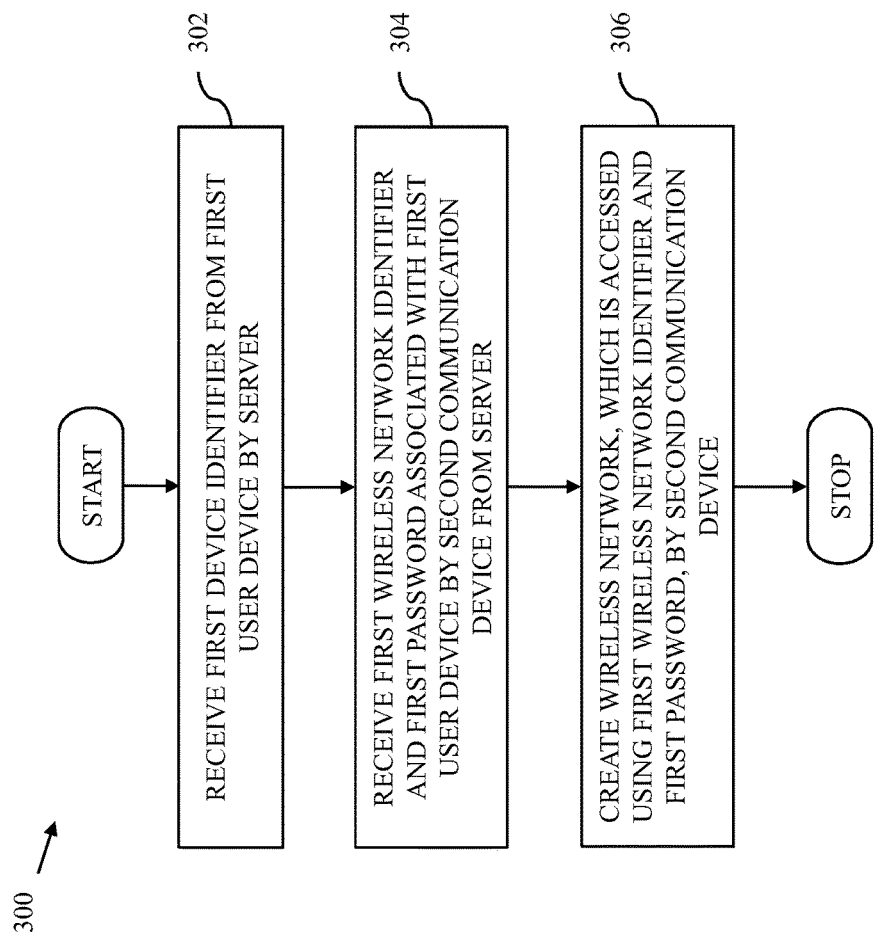
FIG. 3 illustrates a flow chart to illustrate a method for re-connecting to the wireless network, in accordance with an embodiment of the present disclosure.

Referring now to FIG. 3, a flow chart illustrating a method 300 for re-connecting to the wireless network, in accordance with an embodiment of the present disclosure, is shown. At step 302, the server 106 receives the first device identifier from the user device 102*a*. At step 304, the second communication device 104*b* receives the first wireless network identifier and the first password associated with user device 102*a* from the server 106. At step 306, the second communication device 104*b* creates the wireless network, which is accessed by the user device 102*a* using the first wireless network identifier and the first password.

In an alternate embodiment, the communication devices 104 create the Wi-Fi network for the user devices 102 when the user devices 102 are within a threshold distance of the communication devices 104. The locations of user devices 102 and the first communication devices 104 are received by the server 106 from their respective GPS units. When the server 106 determines that the user device 102 is within the threshold distance of the communication device 104, the server 106 transmits the network configuration information to the communication device 104. The network configuration information enables the communication device 104 to create the Wi-Fi network in the taxi. The threshold distance depends on range of the Wi-Fi network created by the communication device 104. For instance, if the range of the Wi-Fi network created by the communication device 104 is 50 meters, the threshold distance may be set to 5 meters. It is to be noted that threshold distance of each communication device in the set of communication device 104*a*-104*m* may be different. Further, the server 106 stores the threshold distances corresponding to each communication device 104.

To connect with the Wi-Fi network associated with the first wireless network identifier for a first time, the user of the user device 102*a* inputs the first password. Subsequently, the communication devices 104*a*-104*m* create the Wi-Fi network with the first wireless network identifier and the first password for the user device 102*a* thereby allowing automatic connection to the Wi-Fi network. Similarly, for the multiple user devices 102*a*-102*n*, wireless network identifiers and passwords are created for automatic Wi-Fi connections. Thus, the system 100 provides a seamless and hassle-free Wi-Fi connectivity to the user devices 102*a*-102*n*. Additionally, the server 106 ensures that the Wi-Fi network is created only when the user devices 102*a*-102*n* are located within the threshold distances of the communication devices 104*a*-104*m*. When the user devices 102*a*-102*n* traverse beyond the threshold distances of the communication devices 104*a*-104*m*, the server 106 instructs the communication devices 104*a*-104*m* to disconnect the Wi-Fi network. Alternatively, the disconnecting may also be done using chauffeur-initiated trigger, or when a request for booking the same taxi is received from another user device. Thus, the system 100 provides efficient control over the wireless networks created by the communication devices 104*a*-104*m*. As the server 106 stores the set of wireless network identifiers and the set of passwords corresponding to the set of device identifiers, the creation of the wireless networks by the communication devices 104*a*-104*m* is managed effectively. Further, usage of the wireless networks is regulated by the server 106 by storing timestamps corresponding to creation of the wireless networks and packet data downloads and/or uploads.

Figure 4:
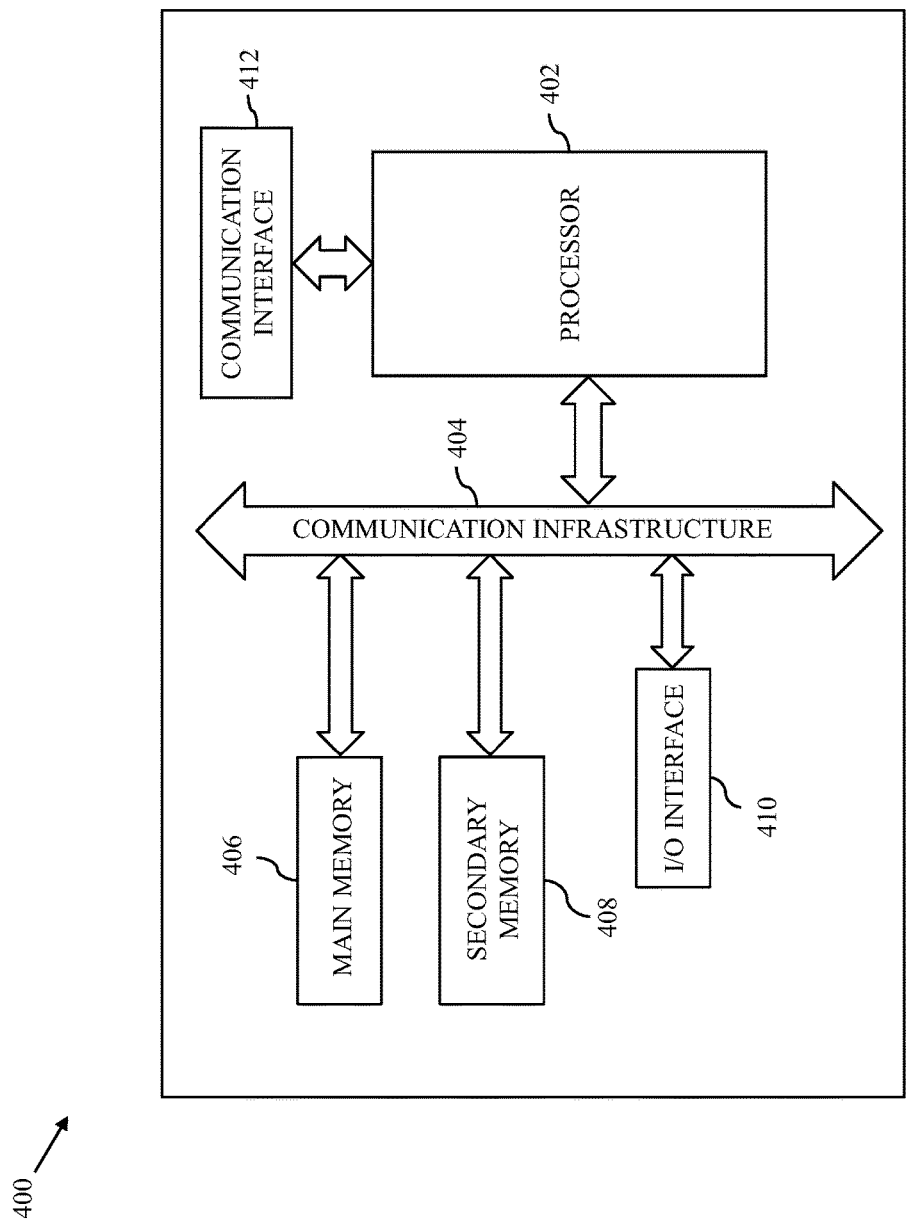
FIG. 4 is a block diagram that illustrates a computer system for creating and managing the wireless network of FIG. 1, in accordance with an embodiment of the present disclosure.

FIG. 4 is a block diagram that illustrates a computer system 400 for creating and managing the wireless networks, in accordance with an embodiment of the present disclosure. An embodiment of present disclosure, or portions thereof, may be implemented as computer readable code on the computer system 400. In one example, the server 106, the user devices 102, and the communication devices 104 of FIG. 1 may be implemented using the computer system 400. Further, the computer system 400 may be realized in the form of a personal computer, a laptop, a server, a tablet, a PDA, a cellular telephone, a server, or any machine that is capable of executing a set of computer instructions that are to be executed by the computer system 400.

The computer system 400 includes a processor 402 that may be a special purpose or a general-purpose processing device. The processor 402 may correspond to a single processor, a plurality of processors, or combinations thereof. The processor 402 may have one or more processor "cores." Further, the processor 402 may be connected to a communication infrastructure 404, such as a bus, a bridge, a message queue, a network, i.e., the network 108, multi-core message-passing scheme, and the like. The computer system 400 further includes a main memory 406 and a secondary memory 408. Examples of the main memory 406 may include RAM, ROM, PROM, EPROM, and the like. The secondary memory 408 may include a hard disk drive or a removable storage drive, such as a floppy disk drive, a magnetic tape drive, an optical disk drive, a flash memory, and the like. Further, the removable storage drive may read from and/or write to a removable storage device in a well-known manner. In one embodiment, the removable storage device may be a non-transitory computer readable recording media.

The computer system 400 further includes an input/output (I/O) interface 410 and a communication interface 412. The I/O interface 410 includes various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may allow data to be transferred between the computer system 400 and various external devices. Exemplary communication interfaces 412 may include a modem, a network interface, i.e., an Ethernet card, a communications port, and the like. Data transferred via the communication interface 412 may be in the form of signals, which may be electronic, electromagnetic, optical, or other signals as will be apparent to persons having skill in the relevant art. The signals may travel via a communication channel (not shown) which may be configured to carry the signals and may be implemented using wire, cable, fiber optics, a phone line, a cellular phone link, a radio frequency link, and the like.

Computer program medium and computer usable medium may refer to memories, such as the main memory 406 and the secondary memory 408, which may be memory semiconductors, such as dynamic RAMs. These computer program products may be means for providing data to the computer system 400 that enable computer system 400 to implement the methods illustrated by FIGS. 2 and 3, as discussed herein. In one embodiment, the present disclosure is implemented using a computer implemented application, the computer implemented application may be stored in a computer program product and loaded into the computer system 400 using the removable storage drive or the hard disc drive in the secondary memory 408, the I/O interface 410, or the communication interface 412.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 402 and a memory such as the main memory 406 and the secondary memory 408 may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

Figure 5:
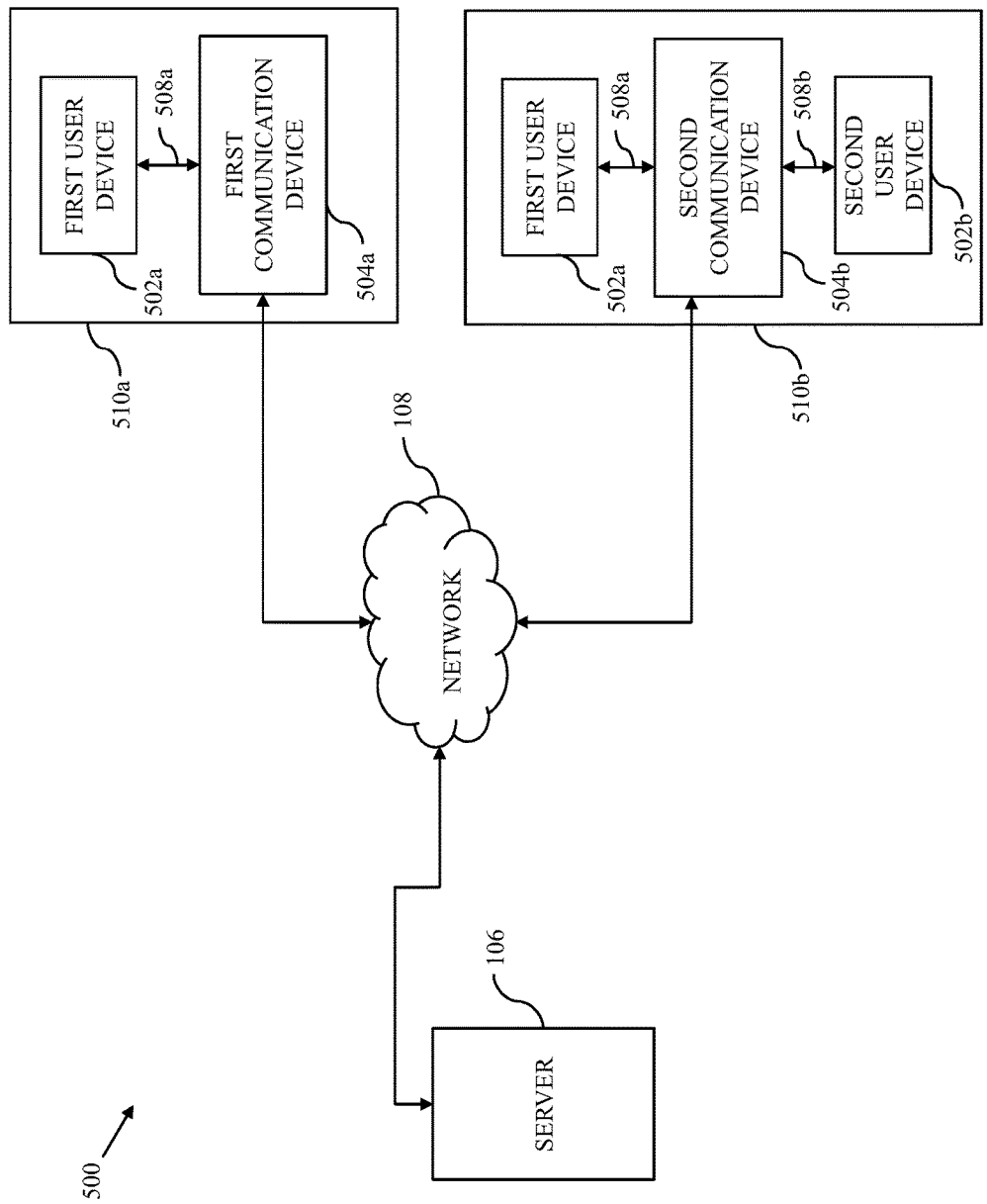
FIG. 5 illustrates a schematic block diagram of a system for creating multiple wireless networks, in accordance with an embodiment of the present disclosure.

Referring now to FIG. 5, a schematic block diagram of a system 500 for creating multiple wireless networks, in accordance with an embodiment of the present disclosure, is shown. The system 500 includes first and second user devices 502a and 502b, first and second communication devices 504a and 504b, and the server 106. The first and second user devices 502a and 502b are owned by a corresponding first and second users (not shown). The first and second communication devices 504a and 504b are connected to the server 106 by way of a communication network such as the network 108. Further, the first and second communication devices 504a and 504b are associated with first and second vehicles 510a and 510b, respectively. Each of the first and second communication devices 504a and 504b may be a multi SSID device that is configured for creating one or more wireless networks. The multi SSID device may include one or more SSIDs for facilitating the one or more wireless networks. In a preferred embodiment, the first and second communication devices 504a and 504b may include first and second SSID slots having first and second SSIDs and create first and second wireless networks 508a and 508b, respectively.

In operation, the first communication device 504a is installed in the first vehicle 510a. The first user may initiate a first booking request, by using a taxi booking application running on the first user device 502a, to book a vehicle such as the first vehicle 510a for a ride. When the first user boards the first vehicle 510a, at least one of the first user device 502a or the first communication device 504a may transmit a Wi-Fi network access request including a first device identifier to the server 106. The first device identifier may be associated with the first vehicle 510a. Further, the server 106 receives the Wi-Fi network access request and compares the first device identifier with each device identifier in the set of device identifiers. When the first device identifier does not match with any device identifier in the set of device identifiers, the server 106 stores the first device identifier in the set of device identifiers. Further, the server 106 generates and stores a first wireless network identifier and a first password corresponding to the first device identifier associated with the first user device 502a. Further, the server 106 transmits first network configuration information that includes the first wireless network identifier and the first password to the first communication device 504a of the first vehicle 510a and the first user device 502a. The first communication device 504a may create a first Wi-Fi network 508a (i.e., the first wireless network 508a) using the first wireless network identifier as an SSID and the first password as an access password. The first user device 502a connects with the first Wi-Fi network 508a created by the first communication device 504a using the first wireless network identifier and the first password and accesses the Internet. The first user device 502a may store the first wireless network identifier and the first password in its memory as a saved network. After completing the ride, the first Wi-Fi network 508a may be disconnected.

Further, the first user device 502a may send a second booking request for booking a vehicle such as the second vehicle 510b by way of the taxi booking application. The second vehicle 510b, which includes the second communication device 504b, receives the second booking request and approaches the location of the first user device 502a, When the second vehicle 510b confirms the second booking request, the server 106 receives the first device identifier from the first user device 502a. The server 106 retrieves the first wireless network identifier and the first password associated with the first user device 502a. Further, the server 106 transmits the first wireless network identifier and the first password to the second communication device 504b. The second communication device 504b creates the first Wi-Fi network 508a with the first wireless network identifier as the SSID and the first password as the access password by using the first SSID slot of the second communication device 504b. As the first wireless network identifier and the first password are stored in the memory of the first user device 502a, the first user device 502a may automatically connect with the first Wi-Fi network 508a created by the second communication device 504b.

Further, the second user associated with the second user device 502b may initiate a third booking request for booking the second vehicle 510b by way of the taxi booking application running on the second user device 502b. The second communication device 504b displays a location of the second user device 502b to a chauffeur of the second vehicle 510b. The chauffeur of the second vehicle 510b approaches the location of the second user device 502b. When the second vehicle 510b arrives at the location of the second user device 502b, the second user boards the second vehicle 510b. At least one of the second user device 502b or the second communication device 504b may transmit a Wi-Fi network access request including a second device identifier to the server 106. The second device identifier may be associated with the second user device 502b. Further, the server 106 receives the Wi-Fi network access request and compares the second device identifier with each device identifier in the set of device identifiers. When the second device identifier does not match with any device identifier in the set of device identifiers, the server 106 stores the second device identifier in the set of device identifiers. Further, the server 106 generates and stores a second wireless network identifier and a second password corresponding to the second device identifier. When the second device identifier matches with any device identifier in the set of device identifiers, the server 106 retrieves the second device identifier from the set of device identifiers. Further, the server 106 transmits second network configuration information that includes the second wireless network identifier and the second password to the second communication device 504b and the second user device 502b. The second communication device 504b may create a second Wi-Fi network 508b (i.e., the second wireless network 508b) using the second wireless network identifier as the SSID and the second password as the access password by using the second SSID slot of the second communication device 504b. The second user device 502b may connect with the second Wi-Fi network 508b created by the second communication device 504b using the second wireless network identifier and the second password to access the Internet. The second user device 502b may store the second wireless network identifier and the second password in its memory as a saved network.

The first and second communication devices 504a and 504b may be configured to create the first and second Wi-Fi networks 508a and 508b, each with different wireless network identifiers and passwords in the taxi such as the second vehicle 510b. The first and second Wi-Fi networks 508a and 508b are Wi-Fi networks. The first and second wireless network identifiers are SSIDs of the first and second Wi-Fi networks 508a and 508b. The first or the second user device 502a or 502b is at least one of a mobile device, a cellular phone, a tablet, and a laptop. Further, the first or the second communication device 504a or 504b may be the multi SSID device that is configured for creating one or more wireless networks including at least one of the first and second Wi-Fi networks 508a and 508b. The multi SSID device may include one or more SSIDs for creating the one or more wireless networks. In one embodiment, a sequence of creating the one or more wireless networks may be determined based on a sequence of one or more booking requests initiated by one or more users. For example, the first and second Wi-Fi networks 508a and 508b may be based on a sequence of the second and third booking requests associated with the first and second user devices 502a and 502b, respectively. In another embodiment, a sequence of creating the one or more wireless networks may be determined based on a sequence of allocation of the one or more SSIDs to one or more user devices associated with one or more booking requests, respectively. For example, the first and second Wi-Fi networks 508a and 508b may be based on a sequence of allocation of the first SSID slot and the second SSID slot of the one or more SSIDs of the second communication device 504b to the first and second user devices 502a and 502b, respectively.

The first and second communication devices 504a and 504b may include the one or more SSID slots (such as the first and second SSID slots) corresponding to the one or more users (such as the first and second users associated with the first and second user devices 502a and 502b) sharing the same taxi (such as the second vehicle 510b). Further, the server 106 may maintain a queue for allocating the one or more SSID slots of each communication device (such as the first or the second communication device 504a or 504b) for creating one or more wireless networks in the same taxi such as the second vehicle 510b. Further when a user (such as the first or second user) finishes a corresponding ride, a user device associated with the user (such as the first or the second user device 502a or 502b) may disconnect from the communication network (such as the first or the second communication device 504a or 504b) and the corresponding SSID slot may be added to an available slot queue. For example, when the first user finishes his trip, the first user device 502a may automatically disconnect from the second communication network 504b, and the first SSID slot may be available for any other user boarding the same taxi such as the second vehicle 510b.

Figure 6:
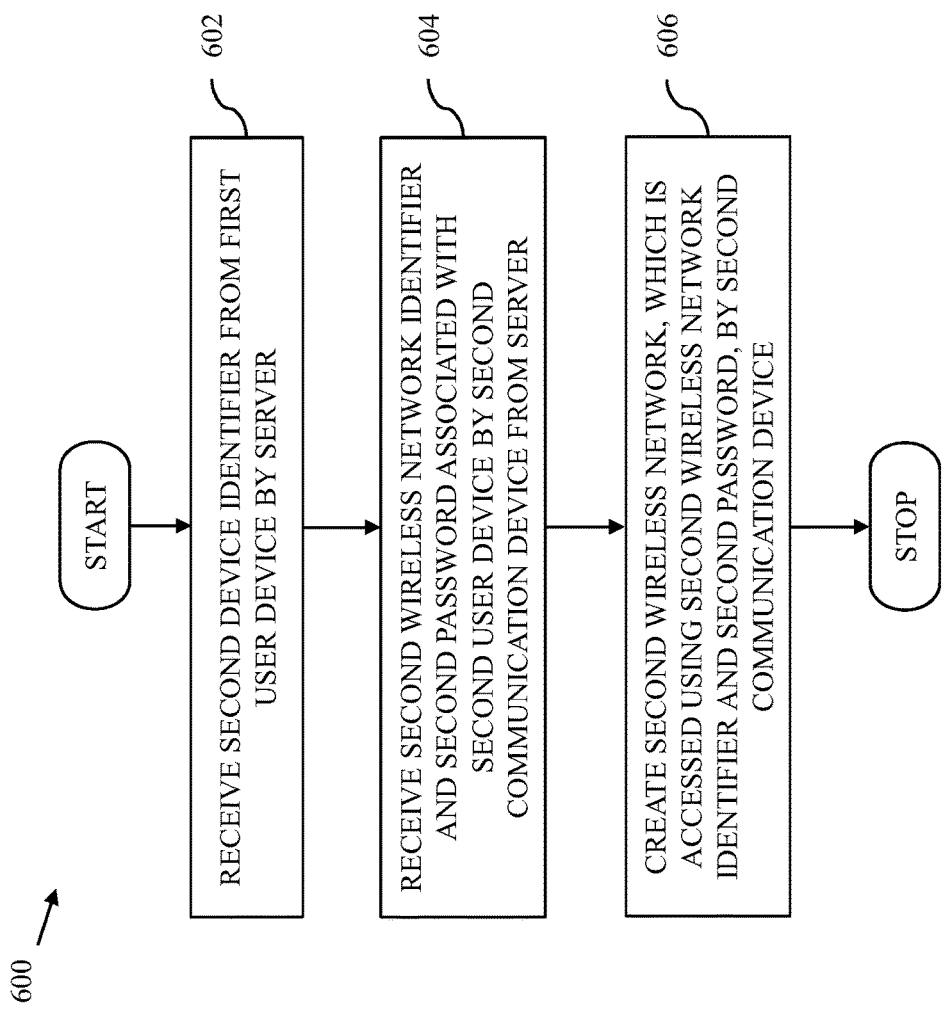
FIG. 6 illustrates a flow chart to illustrate a method for creating multiple wireless networks, in accordance with an embodiment of the present disclosure.

FIG. 6 illustrates a flow chart to illustrate a method for creating multiple wireless networks, in accordance with an embodiment of the present disclosure. At step 602, the server 106 receives the second device identifier from the second user device 502b. At step 604, the second communication device 504b receives the second wireless network identifier and the second password associated with the second user device 502b from the server 106. At step 606, the second communication device 504b creates the second Wi-Fi network 508b, which is accessed by the second user by using the second user device 502b by means of the second wireless network identifier and the second password. The second Wi-Fi network 508b may be created post the creation of the first Wi-Fi network 508a (over which the first user device 502a may be connected) in the same taxi (i.e., the second vehicle 510b). In some embodiments, if the first Wi-Fi network 508a has not been created (since the first user has not yet boarded the second vehicle 510b) but the first SSID slot has been allotted to the first user device 502a, then the second communication device 504b may first create the second Wi-Fi network 508b when the second user boards the second vehicle 510b. The first Wi-Fi network 508a may be created when the first user boards the second vehicle 510b.

A person skilled in the art would appreciate that the disclosure facilitates creation of multiple Wi-Fi networks (such as the first and second Wi-Fi networks 508a and 508b) that are specific to multiple user devices (the first and second user devices 502a and 502b) associated with multiple users (such as the first and second users) sharing the same taxi. As each user is allotted an individual Wi-Fi network, safety and privacy of each user is maintained in the same taxi. Further, congestion of the users may be avoided, thereby facilitating seamless creation and management of the Wi-Fi networks, which have SSIDs and passwords specific to the user devices and may change dynamically based on the user device requesting the taxi.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for creating multiple wireless networks, the method comprising:

transmitting, by at least one of a first communication device and a first user device, a first device identifier to a server;

receiving a first wireless network identifier by the first communication device from the server, wherein the first wireless network identifier is associated with the first device identifier of the first user device and is generated by the server based on the first device identifier;

receiving a first password by the first communication device from the server, wherein the first password is associated with at least one of the first wireless network identifier and the first device identifier of the first user device and is generated by the server based on the first device identifier;

creating a first wireless network by the first communication device based on at least the first wireless network identifier and the first password, whereby the first user device connects to the first wireless network using the first wireless network identifier and the first password;

receiving the first wireless network identifier and the first password from the server by a second communication device, wherein the server receives the first device identifier of the first user device from at least one of the second communication device and the first user device, and transmits the first wireless network identifier and the first password to the second communication device based on the first device identifier of the first user device;

re-creating the first wireless network by the second communication device based on the first wireless network identifier and the first password, after the first wireless network created by the first communication device is disconnected, whereby the first user device re-connects to the first wireless network created by the second communication device using the first wireless network identifier and the first password;

receiving a second wireless network identifier and a second password from the server by the second communication device, wherein the server receives a second device identifier of a second user device from at least one of the second communication device and the second user device, and transmits the second wireless network identifier and the second password to the second communication device based on the second device identifier of the second user device; and creating a second wireless network by the second communication device based on the second wireless network identifier and the second password, whereby the second user device connects to the second wireless network created by the second communication device using the second wireless network identifier and the second password.

2. The method of claim 1, wherein the first and second wireless networks are a Wi-Fi network, wherein the first and second wireless network identifiers are a service set identifiers (SSIDs) of the Wi-Fi network, and wherein the first or the second user device is at least one of a mobile device, a cellular phone, a tablet, and a laptop.

3. The method of claim 1, wherein the first or the second communication device is a multi SSID device that is configured for creating one or more wireless networks including at least one of the first and second wireless networks, and wherein the multi SSID device includes one or more SSIDs.

4. The method of claim 3, wherein a sequence of creating the first and second wireless networks is based on a sequence of first and second requests associated with the first and second user devices, respectively.

5. The method of claim 3, wherein a sequence of creating the first and second wireless networks is based on a sequence of allocation of a first SSID and a second SSID of the one or more SSIDs to the first and second user devices, respectively.

6. The method of claim 1, wherein the first and second communication devices are associated with two different vehicles.

7. A method for creating multiple wireless networks, the method comprising:

receiving a first device identifier from at least one of a first user device and a first communication device by a server, wherein the first device identifier is associated with the first user device;

generating a first wireless network identifier and a first password by the server based on the first device identifier associated with the first user device;

transmitting the first wireless network identifier and the first password to the first communication device by the server;

instructing the first communication device to create the first wireless network based on at least the first wireless network identifier and the first password by the server, whereby the first user device connects to the first wireless network using the first wireless network identifier and the first password stored in a memory of the first user device;

receiving the first device identifier from at least one of the first user device and a second communication device by the server;

transmitting the first wireless network identifier and the first password to the second communication device by the server;

instructing the second communication device to re-create the first wireless network based on the first wireless network identifier and the first password, after the first wireless network created by the first communication device is disconnected, whereby the first user device re-connects to the first wireless network created by the second communication device using the first wireless network identifier and the first password stored in the memory of the first user device;

receiving a second device identifier from at least one of a second user device and the second communication device by the server;

transmitting a second wireless network identifier and a second password to the second communication device by the server; and instructing the second communication device to create a second wireless network based on the second wireless network identifier and the second password by the server, whereby the second user device connects to the second wireless network using the second wireless network identifier and the second password stored in a memory of the second user device.

8. The method of claim 7, wherein the first and second wireless networks are a Wi-Fi network, wherein the first and second wireless network identifiers are a service set identifiers (SSIDs) of the Wi-Fi network, and wherein the first or the second user device is at least one of a mobile device, a cellular phone, a tablet, and a laptop.

9. The method of claim 7, wherein the first or the second communication device is a multi SSID device that is configured for creating one or more wireless networks including at least one of the first and second wireless networks, and wherein the multi SSID device includes one or more SSIDs.

10. The method of claim 7, wherein the first and second communication devices are associated with two different vehicles.

* * * * *